United States Patent [19]
Christensen

[11] Patent Number: 5,574,892
[45] Date of Patent: Nov. 12, 1996

[54] USE OF BETWEEN-INSTRUCTION BREAKS TO IMPLEMENT COMPLEX IN-CIRCUIT EMULATION FEATURES

[75] Inventor: Reed K. Christensen, Hillsboro, Oreg.

[73] Assignee: Intel Corporation, Santa Clara, Calif.

[21] Appl. No.: 396,278

[22] Filed: Feb. 28, 1995

Related U.S. Application Data

[63] Continuation of Ser. No. 85,404, Jun. 30, 1993, abandoned.

[51] Int. Cl.$^6$ .............................. G06F 11/30; G01R 31/28
[52] U.S. Cl. ................ 395/500; 364/927.81; 364/943.9; 364/267.91
[58] Field of Search .................................. 371/15.1, 16.2; 364/578; 395/500, 800

[56] References Cited

U.S. PATENT DOCUMENTS

| | | | |
|---|---|---|---|
| 4,590,581 | 5/1986 | Widdoes, Jr. ............................ | 364/578 |
| 4,633,417 | 12/1986 | Wilburn et al. ......................... | 364/578 |
| 4,674,089 | 1/1987 | Poret et al. ............................... | 371/25 |
| 4,964,074 | 10/1990 | Suzuki et al. ............................ | 395/500 |
| 5,056,013 | 10/1991 | Yamamoto .............................. | 395/500 |
| 5,132,971 | 7/1992 | Oguma et al. .......................... | 371/16.2 |
| 5,226,047 | 7/1993 | Catlin ..................................... | 371/16.2 |
| 5,313,618 | 5/1994 | Pawloski ................................. | 395/500 |
| 5,321,828 | 6/1994 | Phillips et al. .......................... | 395/500 |

OTHER PUBLICATIONS

Designing a VLSI Microprocessor for Emulation By Rivin et al. IEEE. 1990. pp. PS 8.1–8.4.

An In–circuit Signal Analyzer for Mixed Signal Digital Signal Processor; By Beling et al, IEEE, pp. 1109–1112 (1991).

αWIT On–line Debugger for application systems using a μITRON–Specification Operating system by Miyatomi et al, IEEE 1991, pp. 38–42.

Protected–mode debugging using in–circuit emulators; by Barton, Torey, Dr. Dobb's Journal. Fed. 1992 v17 n2 p. 46(8).

Multiple microcontrollers in an embedded system. by Rosebrugh et al, Dr. Dobb's Journal, Jan. 1992 v17 n1 p. 48(6).

Primary Examiner—David Y. Eng
Attorney, Agent, or Firm—Blakely, Sokoloff, Taylor & Zafman

[57] ABSTRACT

A processor uses between-instruction in-circuit emulation breaks to implement complex in-circuit emulation features. The processor uses a bit in hardware that triggers a between-instruction break to in-circuit emulation to permit complex in-circuit emulation reactions such as break after processor reset or break on process switch.

30 Claims, 7 Drawing Sheets

USE OF BETWEEN-INSTRUCTION BREAKS TO IMPLEMENT COMPLEX IN-CIRCUIT EMULATION FEATURES

This is a continuation of application Ser. No. 08/085,404, filed Jun. 30, 1993 now abandoned.

BACKGROUND OF THE INVENTION

1. Field of the Invention

The present invention relates to the field of testing and debugging computer systems, in particular, microprocessor based computer systems. More specifically, the present invention relates to testing and debugging using in-circuit emulation.

2. Art Background

Microprocessor based computer systems are well known and widely available. Generally, the heart of a microprocessor system is a single integrated circuit (IC) chip which contains a processor. Typically, after going through a bootstrap initialization process, the processor reads, decodes and executes a stream of instructions which together form a program or process. Usually, the process is stored in random access memory (RAM) or read only memory (ROM) which is external to the processor chip.

Frequently, when a process is being executed by the processor, a hardware interrupt will occur which causes the processor to suspend execution of the first process and initiate a second process in response to the hardware interrupt. Later, when the second process completes, the processor will return to executing the first process. Additionally, multi-tasking processors are becoming more common. In a multi-tasking processor, a time division multiplexing scheme is implemented by the processor so that the processor appears to be executing several separate processes concurrently. In actuality, the processor is rapidly cycling among several processes and executing a small part of a given process before moving on to execute a small part of the next process in the sequence.

Prototype hardware and system software for a microprocessor system are often tested and debugged using a secondary auxiliary processor (host system), which monitors and controls the prototype system under test (target system). The host system is also known as an in-circuit emulator or development system. Additionally, if the operating software of the target system is not functional enough to permit a local debugger to execute on the target system, testing and debugging are performed using a remote debugger on the host system.

In order for the host system to be able to monitor and control the target system, the host system must be able to stop the target system, inspect or modify the processor and system state, and then allow the target system to resume normal operation. More specifically, the host system typically will be able to:

a) stop the processor of the target system b) inspect the registers and memory locations of the target system, to determine the state of the target system, c) provide a command or instruction to the processor of the target system for execution, d) modify the registers and memory locations of the target system, e) alter the program counters of the target system to resume program execution on the target system at a different location than the location the target system relinquished control to the host system, and f) cause the target system to resume normal operation.

Traditionally, additional pins are provided to the pin-out of the processor chip or a special version of the processor chip of the target system, to allow the host system to be connected to the target system and to perform the monitor and control functions described above. The host system stops the target system by asserting a break signal on one or more of the additional pins of the processor chip. Upon receiving the break signal, the processor chip generally completes the instruction which it is currently executing and then stops and awaits further instructions from the host system. There is frequently a delay from the time that the break is asserted by the host system until the target system stops execution. Additionally, it is not always possible for the host system to observe the state of the target and send the break signal at the proper time to stop the target system at a desired point of execution.

SUMMARY OF THE INVENTION

Target processors which have an in-circuit emulation (ICE) capability have a mechanism which permits a "break" to control by a host system during user instruction execution. When the break occurs, the target system is ready to receive commands from the host system. Typically, a break to ICE will occur during user instruction execution such that the instruction pipeline is broken after the previous instruction has completed and before the next instruction has yet to be executed.

A simple break reaction is said to have occurred if a target system breaks to ICE immediately upon completion of execution of the instruction it was executing when it received a break signal from the host system. If a between-instruction break to ICE is caused by the setting of a bit in hardware, then the target processor can use this ICE break bit to cause more complex break reactions. Two complex break reactions which can be implemented are: break after processor reset and break on process switch.

In the case of break after processor reset, the host system signals the target system to set the ICE break bit at the beginning of processor initialization. Then, at the end of processor initialization, the ICE break bit will signal the processor to cause an ICE break before executing the first user instruction. In this way, the host system can allow the target system processor to complete normal initialization of the processor state. Then, the host system can simply modify the desired portions of the processor state before user instruction execution begins.

In the case of break on process switch, a mechanism is provided such that the ICE break bit is set at the beginning of a process switch action. Then, when the switch is completed, but before the first user instruction is executed in the new process, an ICE break will occur.

BRIEF DESCRIPTION OF THE DRAWINGS

The objects, features, and advantages of the method and apparatus of the present invention will be apparent from the following detailed description of the invention in which.

DETAILED DESCRIPTION OF THE INVENTION

A method and apparatus for implementation of complex in-circuit emulation features is disclosed. The method and apparatus of the present invention has particular application to testing and debugging of microprocessor based computer systems.

In the following description, for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention unnecessarily.

Figure 1:
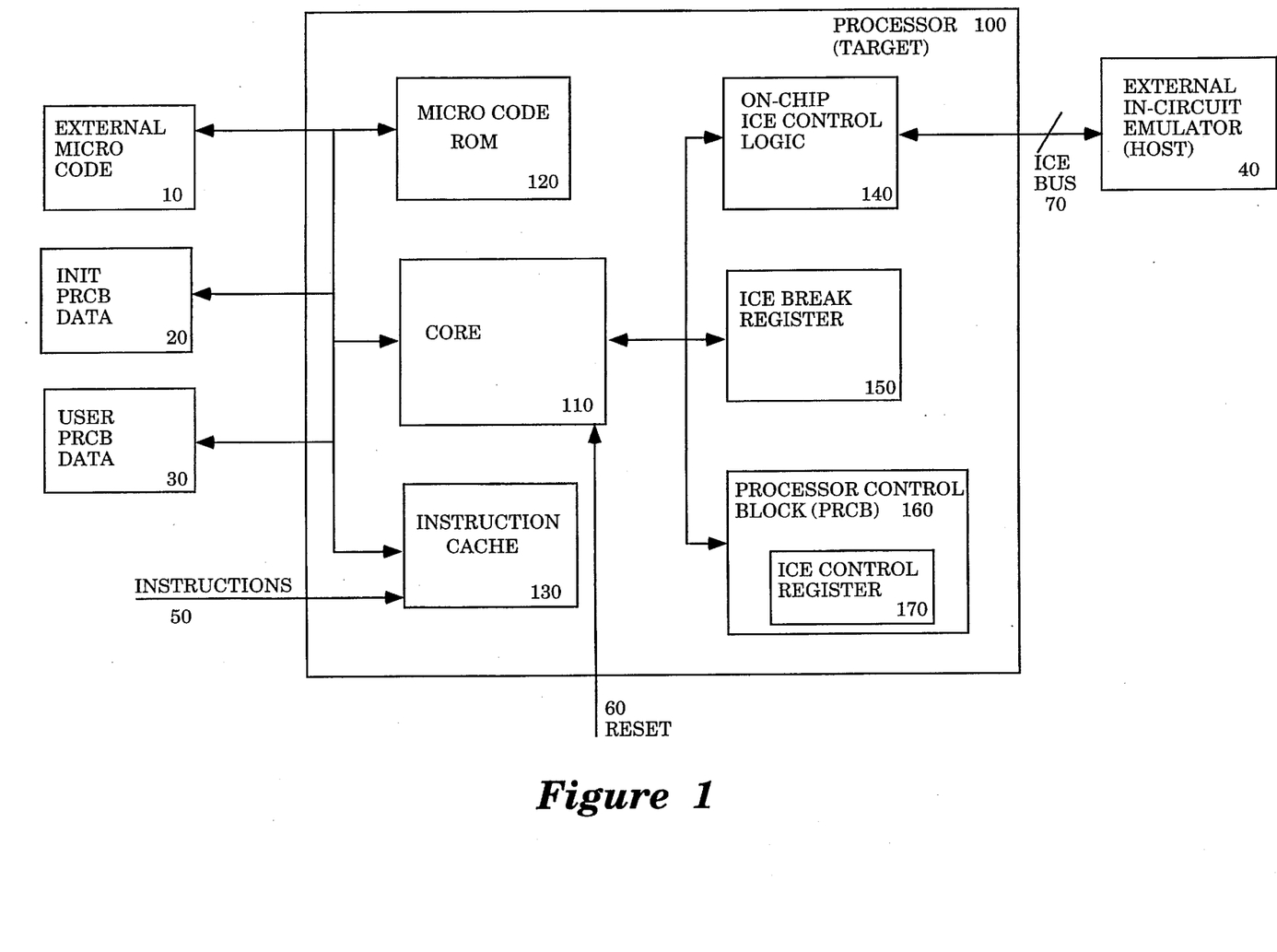
FIG. 1 illustrates a microprocessor based computer system which includes an external in-circuit emulator processor.

Referring now to FIG. 1, a microprocessor based target system is shown coupled to a host system so that in-circuit emulation (ICE) can be performed. In FIG. 1, external in-circuit emulator 40 (the host system) is coupled to processor 100 (the target system) by in-circuit emulation bus 70. It will be obvious to one of ordinary skill in the art that external ICE 40 can be a general purpose computer such as a personal computer. Alternately, external ICE 40 can be a dedicated processor developed specifically for providing in-circuit emulation.

The heart of processor 100 is core 110. Core 110 is where code is executed. Core 110 has an instruction decoder, an execution unit and a register file. In one embodiment of the present invention, processor 100 is a reduced instruction set computing (RISC) processor. As such, processor 100 executes macro instructions sequentially. If a macro instruction can not be executed as a single risc instruction, it will cause a string of micro code instructions to execute. Then, the next macro code instruction will execute.

As can be seen in FIG. 1, macro code instructions enter processor 100 through instruction bus 50 and are stored in instruction cache 130 until they are required by core 110. If one of the macro code instructions requires micro code, the micro code is retrieved by core 110 from micro code ROM 120.

Processor control block (PRCB) 160 is coupled to core 110 and contains a set of registers which contain and support bits for various functions of processor 100. Typical information stored in PRCB 160 includes trace bits, execution mode bits, interrupt bits, system architecture bits and RAM bits.

During a typical reset of processor 100, reset pin 60 is asserted causing a reset signal to be input to core 110. In one embodiment of the present invention, upon receipt of the reset signal, the core 110 initiates a two-stage initialization process. In the first stage initialization, the core accesses special ROM or RAM located off the normal user bus and reads PRCB initialization data 20 which it then loads into the PRCB 160. Once the PRCB 160 has been initialized, the core 110 is able to execute user code (sometime referred to as "start-up code"), but only in physical addressing mode.

After the start-up code has completed execution, a typical boot procedure is to access user PRCB data 30 which is stored external to processor 100 in ROM or RAM. User PRCB data 30 is then loaded into PRCB 160 by core 110. Core 110 then qualifies a process preparatory to executing user code of the process in virtual memory mode. Once the process has been qualified, the process is then executed in virtual memory mode.

External in-circuit emulator 40 can assert a break signal on ICE bus 70 to processor 100. Upon receipt of the break command, on-chip ICE control logic 140 sets the break bit, which inturn interrupts the core 110. Upon receipt of the interrupt, core 110 completes the macro code instruction that it is executing and then stops before executing the next macro code instruction. In this way, a basic break mechanism is provided wherein during the execution of user instructions, a break to ICE occurs "between" user instructions. Used in this context, "between" means that a break occurs in the instruction pipeline after a previous instruction has completed and before the next instruction has yet to be executed. Once the processor has stopped, the external in-circuit emulator 40 can send commands to, and receive data from, on-chip ICE control logic 140 via ICE bus 70. These commands and data permit external in-circuit emulator 40 to examine and modify the state of processor 100, and thereby perform debug operations.

In the present invention, ICE break register (IBR) 150 is also coupled to core 110. If a break bit in ICE break register 150 is set, a between-instruction break to ICE will occur. As mentioned above, PRCB 160 contains trace bits. These trace bits are stored in ICE control register 170 which is part of PRCB 160. Included in the trace bits are feature control bits which correspond to complex ICE features. When a particular feature control bit is set, instructions executing in core 110 are monitored until a criterion is met which indicates the need for a between-instruction break for the corresponding complex feature. When the criterion is met, the break bit of IBR 150 is set. Processor 100 will then continue execution of micro code instructions until it reaches a macro code instruction. Before executing the macro code instruction, processor 100 stops and signals external in-circuit emulator 40 that the complex feature has occurred. In this way, the present invention is able to implement complex break features.

Two examples of complex in-circuit emulation features which may be implemented by the present invention are break after processor reset and break on process switch. Example embodiments of the former and latter complex features will be described below in greater detail in connection with FIGS. 2–5 and FIGS. 6–7, respectively.

The two complex in-circuit emulation features described below are examples of the use of between-instruction breaks to implement complex in-circuit emulation features. It will be obvious to one of ordinary skill in the art that the present invention has applicability beyond the two examples provided and is readily extensible in a straight forward manner thereto.

Figure 2:
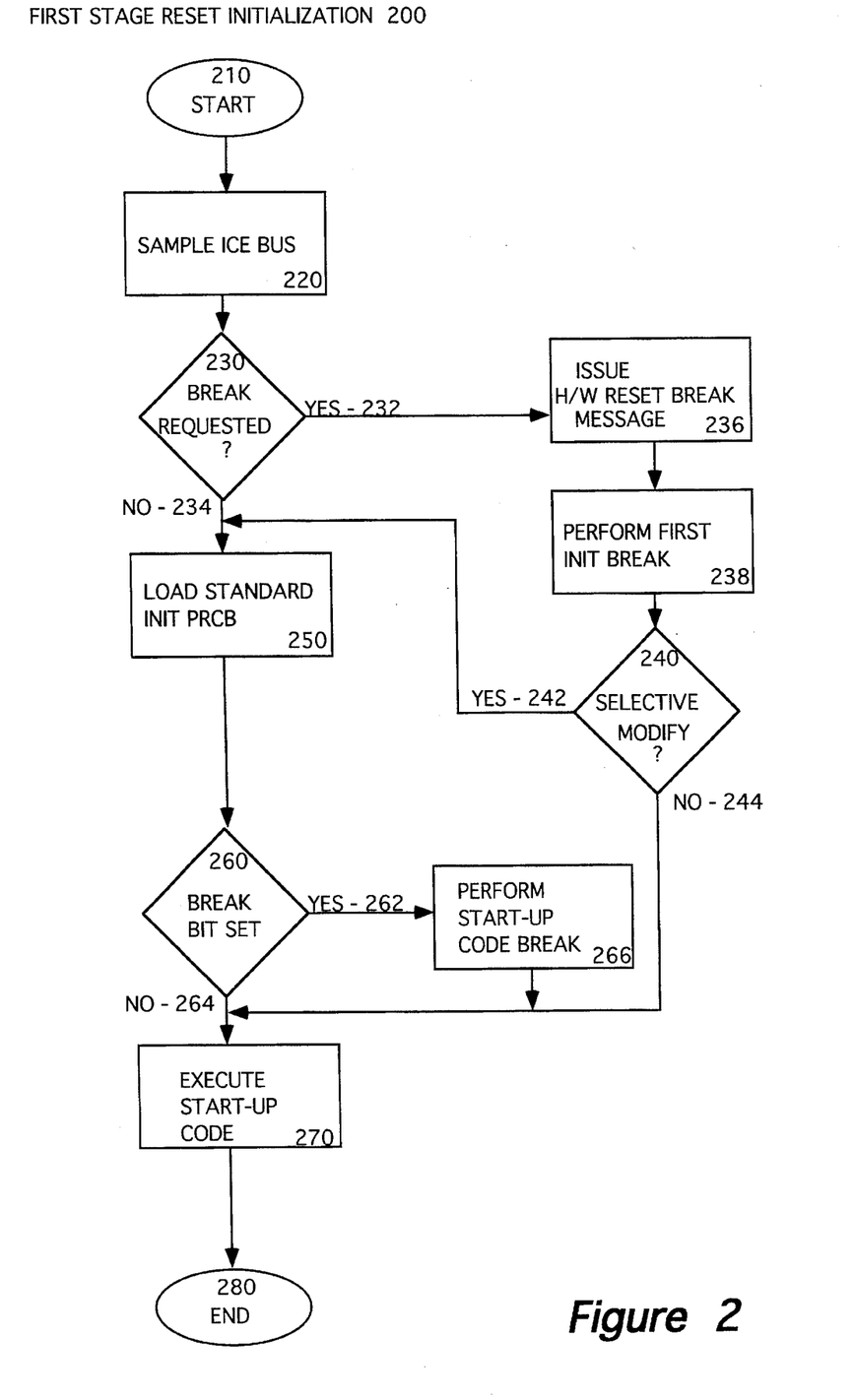
FIG. 2 illustrates a flow chart for the first initialization of an embodiment of the microprocessor system of FIG. 1.

Referring now to FIG. 2, a flow chart of one embodiment which uses the present invention to implement a complex in-circuit emulation break after processor reset feature is depicted. In FIG. 2, the first stage reset initialization 200 begins at start bubble 210 when a reset signal is asserted to the microprocessor. Upon receiving the reset signal, the microprocessor samples the in-circuit emulation bus (process block 220) to see if a request for an in-circuit emulation break has been asserted on the bus (decision block 230). If no request for a break has been asserted on the ICE bus, then a standard initialization is to be performed and processing continues on decision path 234 to process block 250 where the standard initialization PRCB is loaded into the microprocessor.

After loading the standard initialization PRCB, processing continues to decision block 260 where a test is performed to determine whether the break bit has been set. During a normal initialization, because no break was requested, the break bit was not set. Therefore decision path 264 is taken to process block 270 where the start-up code is executed thereby completing a normal first stage initialization after reset of the microprocessor.

Referring again to decision block 230, if a break request is asserted on the ICE bus when the ICE bus is sampled in process block 220, decision path 232 is taken and the processor issues a hardware reset break message across the ICE bus to the host system (process block 236). Upon receiving the hardware reset break message, a first initialization break procedure is performed by the host system (as illustrated in process block 238 and in greater detail in FIG. 3). During the first initialization break, the host system has two options regarding the initialization of the PRCB. The host system can either set the break bit and selectively modify the standard initialization PRCB of the target system (a complex ICE break) or can entirely replace the PRCB contents. If the initial PRCB is stored in ROM, rather than stored in RAM, selective modification is used because entire replacement of the PRCB cannot be performed in ROM.

As depicted in decision block 240 of FIG. 2, if the entire PRCB was to be changed, rather than selectively modified, then the desired PRCB would have been loaded onto the target system from the host system over the ICE bus during process block 238. Therefore, if a selective modification was not to be done, processing would continue from decision block 240 along decision path 244 directly to process block 270 where the start-up code would be executed before the first initialization would terminate at terminal bubble 280.

Referring again to decision block 240 of FIG. 2, if the PRCB is to be selectively modified, then decision path 242 is taken to process block 250 where the standard initialization PRCB is loaded onto the target microprocessor. After the standard initialization PRCB has been loaded, the break bit is tested in decision block 260. The break bit was set in process block 238 by the first initialization break, so processing will continue along decision path 262 to process block 266 where a break will occur before execution of the start-up code in process block 270. Since a selective modification of the standard initialization PRCB was to be performed, and the standard initialization PRCB was loaded onto the target microprocessor in process block 250, the host system can then modify the internal state of the target microprocessor (i.e., PRCB 160) as depicted in process block 266 and described in greater detail in connection with FIG. 4.

Figure 3:
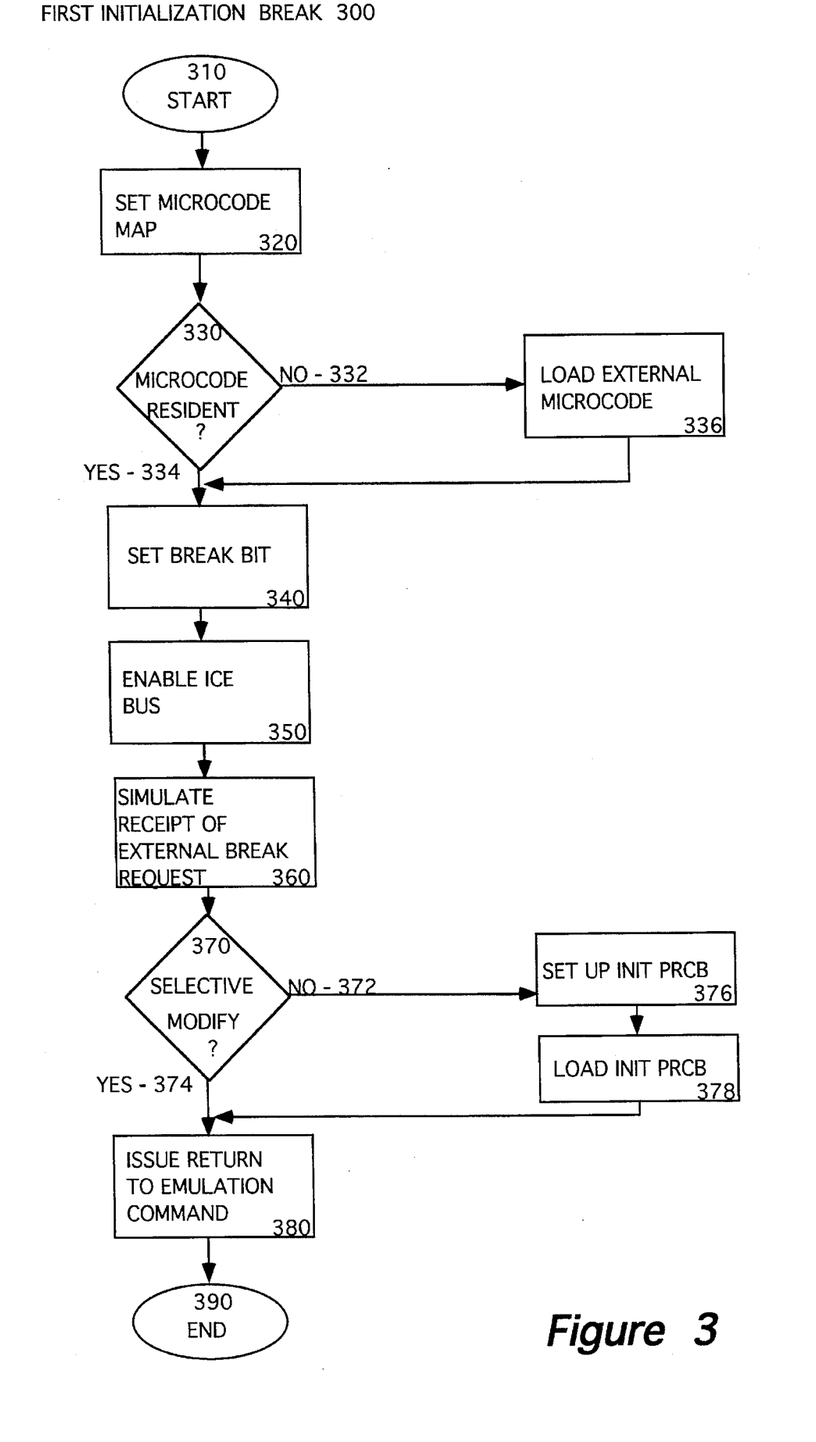
FIG. 3 illustrates a flow chart of in-circuit emulation during a first initialization break.

Referring now to FIG. 3, a flow chart is illustrated for the first initialization break 300 process which was performed in process block 238 of FIG. 2. In FIG. 3, first initialization break 300 begins at start bubble 310 and proceeds to process block 320 where a SET MICRO CODE MAP command is issued by the target system to the host system over the ICE bus. The SET MICRO CODE MAP command is required because, in this embodiment of the present invention, micro code required to execute the in-circuit emulation is stored external to the target microprocessor. The SET MICRO CODE MAP command provides the target processor with the address where the external micro code can be located.

In one embodiment of the present invention, the external micro code is not resident in the private memory pointed to by the micro code map. Therefore, if the micro code is not resident, decision path 332 of decision block 330 is taken to process block 336. In process block 336, the load external micro code command is given to the target system thereby causing the external micro code to be loaded into the private memory.

If the external micro code is already resident in the private memory, then decision path 334 is taken from decision block 330 directly to process block 340 where the break bit is set. After setting the break bit, the host system instructs the target system to enable the ICE bus (process block 350) and to simulate receipt of an external break request (process block 360).

If a selective modification of the initial PRCB is to be performed, then decision path 374 is taken from decision block 370 to process block 380 where the host system issues a RETURN TO EMULATION command before terminating at terminal block 390. The RETURN TO EMULATION command will return control to the target processor. As explained above in connection with FIG. 2, the target processor will load the initialization PRCB and then, because the break bit has been set, will halt immediately prior to execution of the start-up code. When the target system stops, control is returned to the host system which can then selectively modify the PRCB 160 as will be described below in greater detail in connection with FIG. 4.

Referring again to decision block 370 of FIG. 3, if the initialization PRCB is to be completely replaced by a different initialization PRCB, decision path 372 is taken to process block 376 where the new initialization PRCB is set up by the host system. Then, in process block 378, the host system loads the replacement initialization PRCB into the target system before issuing the RETURN TO EMULATION command (process block 380) and terminating the first initialization break (terminal bubble 390).

Replacing the entire initialization PRCB can be accomplished two different ways. In the first way, the contents of INIT PRCB DATA block 20 (FIG. 1) can be replaced. In the second way, the host must essentially re-create the processor initialization sequence and thereby load PRCB. The first way requires that INIT PRCB DATA block 20 (FIG. 1) be RAM. Thus, the first way cannot be used in the case where INIT PRCB DATA block 20 (FIG. 1) is ROM. The second way, on the ther hand, is a time consuming process requiring the issuing of between 30 and 40 commands from the host system to the target system.

The complex break after reset feature permits the host system to set a break bit, let the target system load an initialization PRCB and then halt. The host system can then selectively modify the PRCB before the start-up code begins. Typically, only a few commands must be issued by the host system to up-date the initial PRCB to a desired state when the selective modification is performed.

Figure 4:
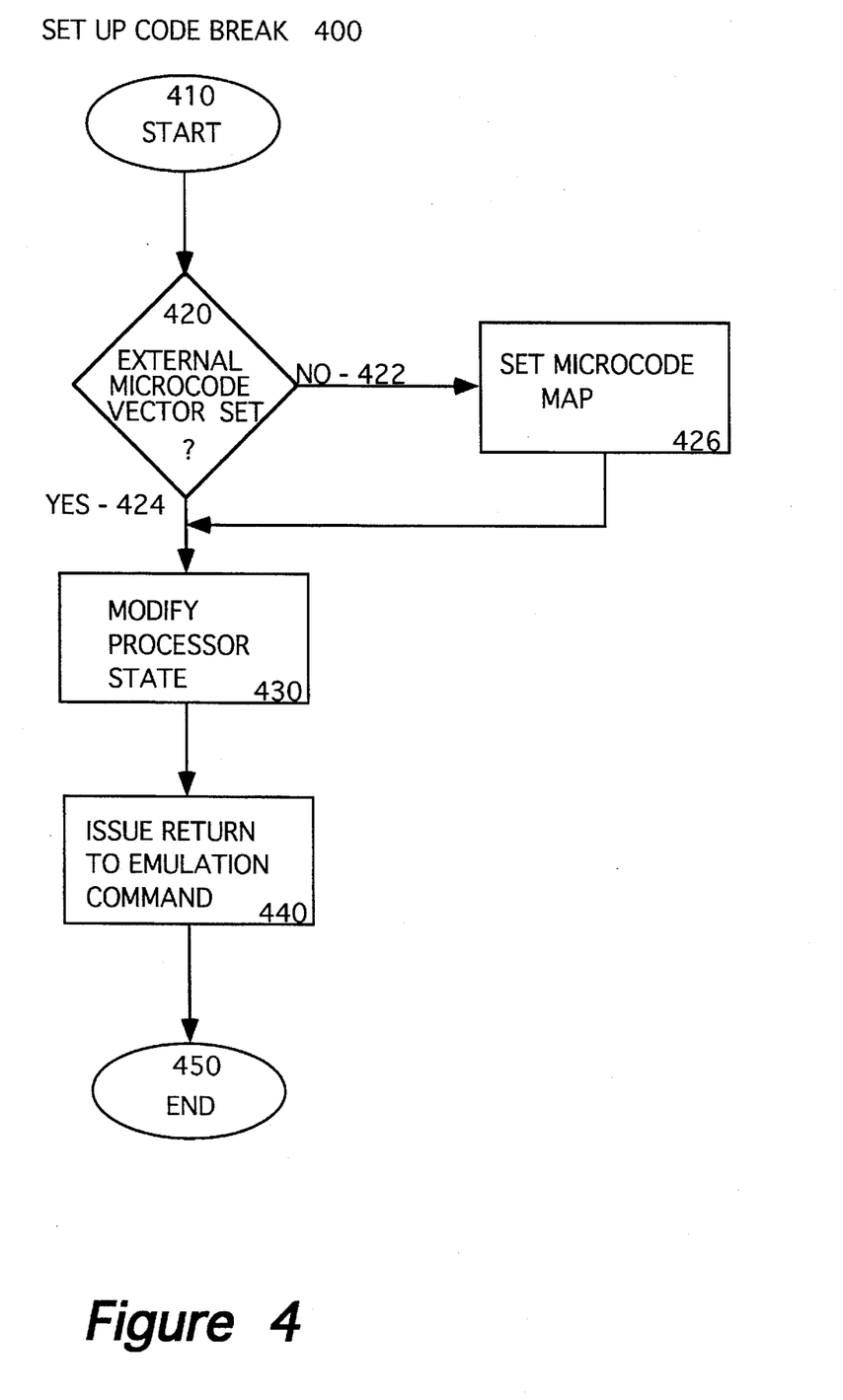
FIG. 4 illustrates a flow chart of in-circuit emulation immediately prior to execution of start-up code.

Referring now to FIG. 4, a detailed flow chart of the start-up code break process of process block 266 of FIG. 2 is illustrated. In FIG. 4, the start-up code break 400 process begins at start bubble 410 and continues to decision block 420. In one embodiment of the present invention, loading of the standard initialization PRCB would have caused the external micro code vector to be set. In another embodiment, the micro code vector would not have been set. If the external micro code vector has not been set, then decision path 422 is taken to process block 426 where the host system must reissue the SET MICRO CODE MAP command. Once the external micro code vector has been set, the processor state (i.e. the PRCB) can be modified selectively as required (process block 430). Once the desired processor state has been established, the host system issues a RETURN TO EMULATION command (process block 440) before terminating the start-up code break in terminal bubble 450. The RETURN TO EMULATION command then returns control to the target system which executes the start-up code.

Figure 5:
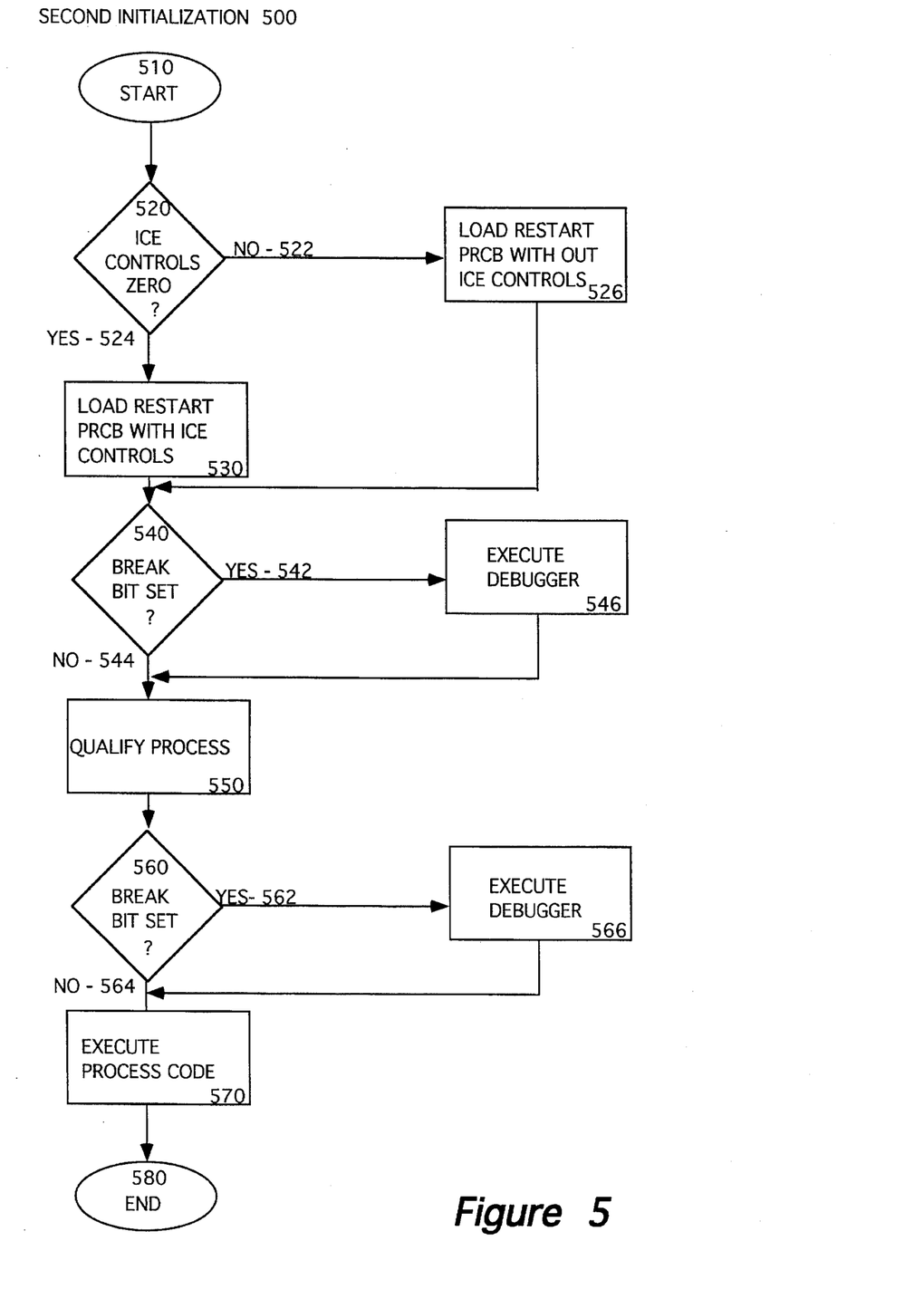
FIG. 5 illustrates a flow chart of the second initialization of the mircoprocessor.

Referring now to FIG. 5, a flow chart of the second initialization stage of the boot-strap operation of one embodiment of the present invention is depicted. As mentioned above, the second initialization stage occurs after completion of execution of the start-up code. It is a software reset used by the processor to change from physical addressing mode to virtual memory mode so that processes can be executed in virtual memory mode.

If, during the first initialization stage, there was no in-circuit emulation break, then the standard initialization PRCB would have been loaded into the target system. Therefore, in a second initialization where no in-circuit emulation is to be performed, the second initialization will start at bubble 510 and a test will be made in decision block 520 to determine whether the ICE controls are zero. Typically, the ICE controls, which are part of the PRCB, are all zero in a standard initialization PRCB. If the ICE controls are zero, then that means that the in-circuit emulation was not invoked during the first initialization and is not to be invoked during the second initialization. In that case, decision path 524 is taken to process block 530 where the restart (user) PRCB which contains ICE controls desired by the user is loaded into the target system. If the ICE controls are still zero after loading the user PRCB, the break bit will not be set, and processing will continue from decision block 540 to process block 550 along decision path 544. In process block 550, the process will be qualified and then another test will be performed in decision block 560 to determine whether the break bit was set. Since the break bit will not have been set, decision path 564 will be taken to process block 570 where the process code will be executed and the second initialization will terminate.

If in-circuit emulation was performed during the first initialization, and is desired during the second initialization, then in decision block 520 the ICE controls will not be zero. In that event, path 552 will be taken to process block 526 where the target system will load, with the exception of the ICE controls, the restart PRCB. Thus a break before reset bit in the ICE controls will remain set to signal that incircuit emulation is desired during the second initialization.

Once the PRCB has been loaded into the target system, the break before reset bit is tested in decision block 540, and if it has been set, decision path 542 is taken to process block 546 where the debugger control is returned to the host system. The host system can then replace or modify the user PRCB before issuing a command to return control to the target system. The target system then qualifies the process to be executed in process block 550.

After the process to be executed has been qualified, the break bit is tested again in decision block 550. If the break bit has been set, then decision path 562 is taken to process block 556 where the debugger is again invoked before execution of the first instruction of the process code begins in process block 570.

Figure 6:
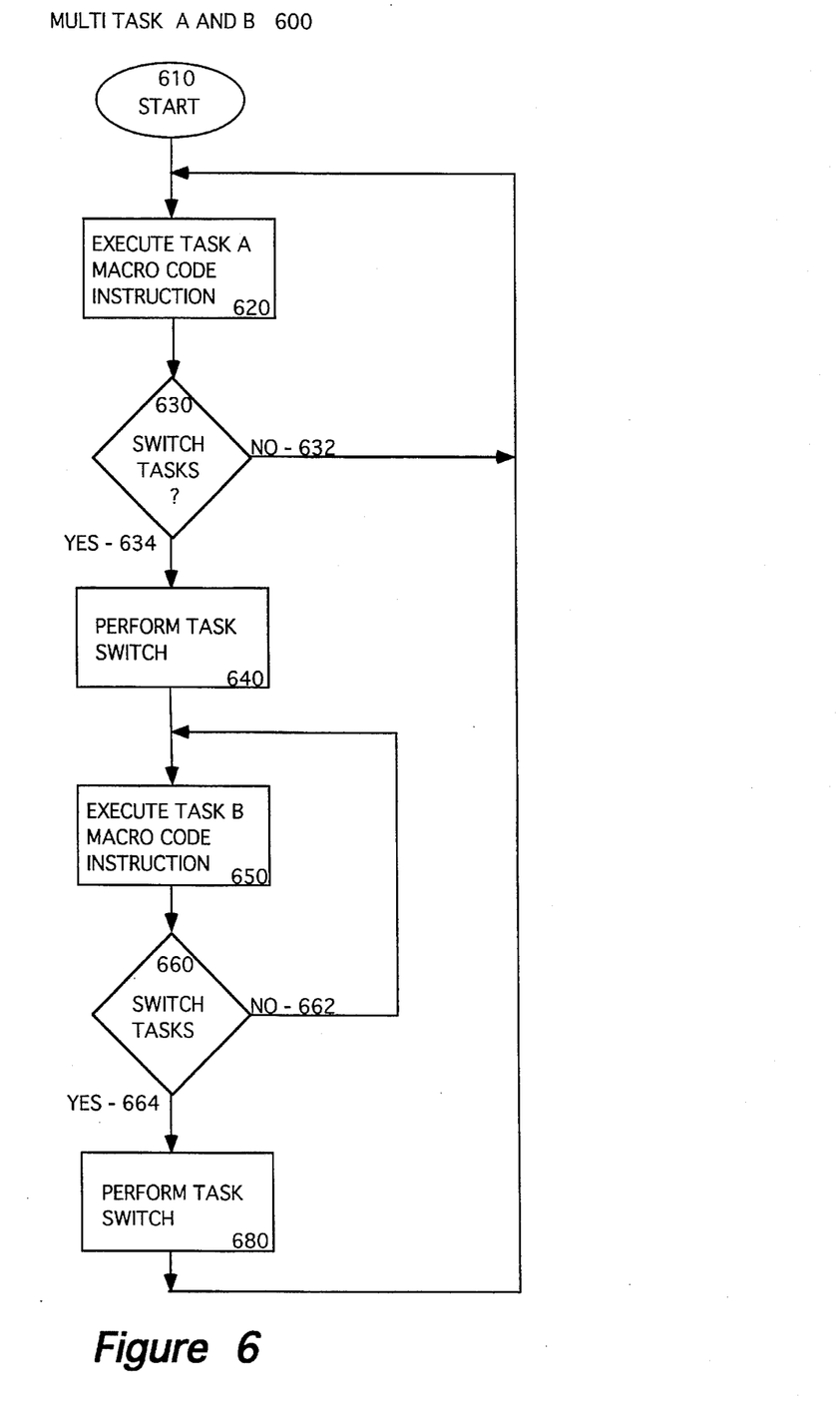
FIG. 6 illustrates a flow chart of the multi-tasking of two processes by the microprocessor.

Referring now to FIG. 6, a flow chart of a simple multi-tasking between two tasks (A and B) is illustrated. Processing begins in start bubble 610 and proceeds to process block 620 where a single macro code instruction of task A is executed. After the task A macro code instruction has been executed, a test is performed in decision block 630 to determine whether a switch should be made from task A to task B. If no task switch is required, then decision 632 is taken to process block 620 where the next macro code instruction of task A is executed.

If, on the other hand, a switch from task A to task B is required in decision block 630, decision path 634 will be taken to process block 640 where the task switch is performed by execution of a micro code instruction flow. Details of the task switch micro code instruction flow are presented below in connection with FIG. 7.

After the task switch has been made, a single macro code instruction of task B is executed in process block 650. A test is then performed in decision block 660 to see whether a switch should be made back to task A. If no switch is to be made, then decision path 662 is taken to process block 650 where the next macro code instruction of task B is executed.

If, on the other hand, a switch from task B back to task A is detected in decision block 660, decision path 664 is taken to process block 680 where a micro code instruction flow is executed which causes the processor to return to processing task A. Processing then continues with the execution of the next macro code instruction of task A in process block 620.

Figure 7:
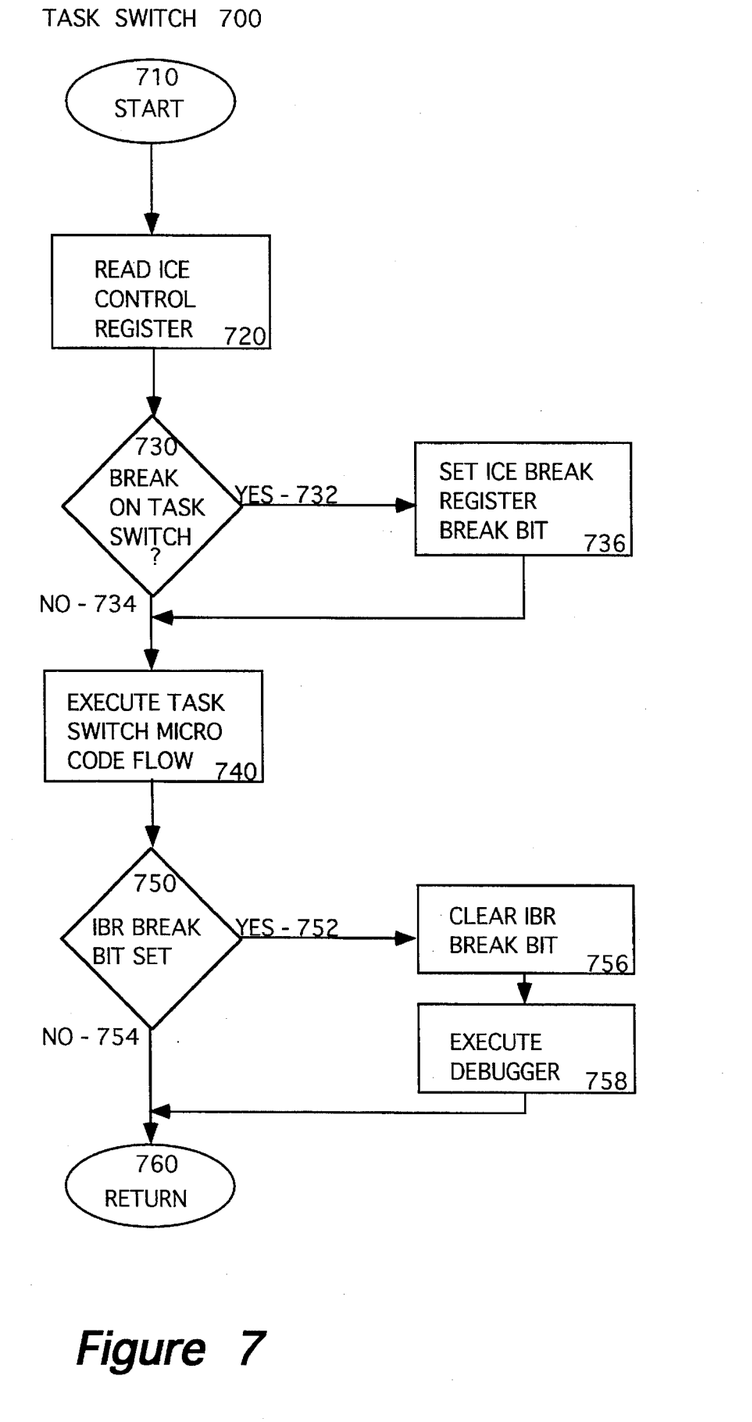
FIG. 7 illustrates a flow chart of a complex in-circuit emulation break upon task switch feature.

Referring now to FIG. 7, a flow chart of the task switch micro code instruction flow of process blocks 640 and 680 of FIG. 6 is illustrated. In FIG. 7, the present invention uses complex, in-circuit emulation commands to cause an incircuit emulation break upon task switch. The complex in-circuit emulation feature permits the in-circuit emulator to detect a task switch, thereby allowing implementation of an in-circuit emulation break upon task switch feature.

In the present invention, there is a break on task switch bit in the ICE control register of the PRCB. The break on task switch bit can be set by the in-circuit emulator, for example in process block 566 of FIG. 5, thereby causing the complex in-circuit emulation feature of break on task switch to be invoked.

In FIG. 7, the micro code flow which is used by the present invention to cause a task switch to occur is illustrated. The ICE control register is read in process block 720 and a test is made in decision block 730 to determine whether the break on task switch bit of the ICE control register has been set. If the break on task switch bit has been set, then decision path 732 is taken to process block 736 where a micro code instruction is issued which sets the ICE break register break bit. Processing then continues to process block 740 where the standard micro code flow to cause a task switch to be performed is executed.

Once the standard task switch micro code flow (process block 740) has completed, the ICE register break bit is tested in decision block 750 to determine whether an in-circuit emulation break on task switch is to be performed. If the ICE break register break bit was set in process block 736, decision path 752 will be taken to process block 756 where the ICE break register break bit can be cleared before control is turned over to the host system. In-circuit emulation commands can then be issued by the host system and the desired task switch break debugging can occur. Upon completion of the task switch break debugging, control is returned to the target system and task switch micro code flow 700 terminates at terminal block 760. The next macro code instruction of the task being switched to is then executed.

While the method and apparatus of the present invention has been described in terms of its presently preferred and alternate embodiments, those skilled in the art will recognize that the present invention may be practiced with modification and alternation within the spirit and scope of the appended claims. The specifications and drawings are, accordingly, to be regarded in an illustrative rather than a restrictive sense.

What is claimed is:

1. In a computer system comprising a host system, a target system and an in-circuit emulation bus, said in-circuit emulation bus for communication of in-circuit emulation commands and data between said host and said target, a method for said host to invoke a complex in-circuit emulation teat of said target, said method comprising the steps of:

said host accessing said target across said in-circuit emulation bus and setting a test desired indicator to indicate to said target that said complex in-circuit emulation test is to be performed, said complex in-circuit emulation test having an impending test point wherein an impending test criterion can be determined to be met and a begin test point wherein a begin test criterion can be determined to be met;

after setting said test desired indicator, said host notifying said target to resume execution;

said target then resuming execution;

if said test desired indicator has been set and said target reaches said impending test point, said target setting a test break indicator and resuming execution without intervention from said host; and if said test break indicator has been set and said target reaches said begin test point, said target halting said execution and permitting said host to perform said complex in-circuit emulation test.

2. The method as set forth in claim 1 wherein said impending test criterion is said target beginning a predetermined reset sequence.

3. The method as set forth in claim 2 wherein said begin test point occurs upon completion of said predetermined reset sequence.

4. The method as set forth in claim 3 wherein said target sets a state value in a control register during said predetermined reset sequence and said state value is modified by said host during said complex in-circuit emulation test.

5. The method as set forth in claim 1 wherein said impending test criterion is said target beginning a predetermined task switch sequence.

6. The method as set forth in claim 5 wherein said begin test point occurs upon completion of said predetermined task switch sequence.

7. In a computer system comprising a host system, a target system and an in-circuit emulation bus, said in-circuit emulation bus for communication of in-circuit emulation commands and data between said host and said target, an apparatus disposed on said target, said apparatus comprising:

test desired sensing means for sensing a command from said host to said target that a complex in-circuit emulation test is to be performed, said complex in-circuit emulation test having an impending test point wherein an impending test criterion can be determined to be met and a begin test point wherein a begin test criterion can be determined to be met;

execution means for executing sequences of computer instructions;

test desired indicator means for indicating to said target that said complex in-circuit emulation test is to be performed, said test desired indicator means set by said test desired sensing means when said complex in-circuit emulation test is to be performed;

resume execution sensing means for sensing a resume execution command from said host and, upon sensing said resume execution command, said resume execution sensing means causing said execution means to resume execution;

test break indicator means;

impending test sensing means for monitoring said execution means and, if said impending test point is reached, said impending test sensing means sets said test break indicator means without halting execution;

begin test criterion sensing means for monitoring said execution means and, if said begin test point is reached when said test break indicator means has been set, said begin test criterion sensing means halts said execution and permits said host to perform said complex in-circuit emulation test.

8. The apparatus as set for the in claim 7 wherein said impending test sensing means monitors said execution means only when said test desired indicator means indicates that said complex in-circuit emulation test is to be performed.

9. The apparatus as set forth in claim 8 wherein said begin test criterion sensing means monitors said execution means only when said test break indicator means is set.

10. The apparatus as set forth in claim 7 wherein said impending test criterion is said target beginning a predetermined reset sequence.

11. The apparatus as set forth in claim 10 wherein said begin test point occurs upon completion of said predetermined reset sequence.

12. The apparatus as set forth in claim 11 wherein said apparatus further comprises control register means for storing a state value, said execution means setting said state value during execution of said predetermined reset sequence and said state value is modified by said host during said complex in-circuit emulation test.

13. The apparatus as set forth in claim 7 wherein said impending test criterion is said execution means beginning a predetermined task switch sequence.

14. The apparatus as set forth in claim 13 wherein said begin test point occurs upon completion of said predetermined task switch sequence.

15. In a computer system comprising a host system, a target system and an in-circuit emulation bus, said in-circuit emulation bus for communication of in-circuit emulation commands and data between said host and said target, an apparatus disposed on said target, said apparatus comprising:

a test desired sensor for sensing a command from said host to said target that a complex in-circuit emulation test is to be performed, said complex in-circuit emulation test having an impending test point wherein an impending test criterion can be determined to be met and a begin test point wherein a begin test criterion can be determined to be met;

an executor for executing sequences of computer instructions;

a test desired indicator for indicating to said target that said complex in-circuit emulation test is to be performed, said test desired indicator set by said test desired sensor when said complex in-circuit emulation test is to be performed;

a resume execution sensor for sensing a resume execution command from said host and, upon sensing said resume execution command, said resume execution sensor causing said executor to resume execution;

a test break indicator;

an impending test sensor for monitoring said executor and, if said impending test point is reached, said impending test sensor sets said test break indicator without halting execution;

a begin test criterion sensor for monitoring said executor and, if said begin test point is reached when said test break indicator has been set, said begin test criterion sensor halts said execution and permits said host to perform said complex in-circuit emulation test.

16. The apparatus as set forth in claim 15 wherein said impending test sensor monitors said executor only when said test desired indicator indicates that said complex in-circuit emulation test is to be performed.

17. The apparatus as set forth in claim 16 wherein said begin test criterion sensor monitors said executor only when said test break indicator is set.

18. The apparatus as set forth in claim 15 wherein said impending test criterion is said target beginning a predetermined reset sequence.

19. The apparatus as set forth in claim 18 wherein said begin test point occurs upon completion of said predetermined reset sequence.

20. The apparatus as set forth in claim 19 wherein said apparatus further comprises a control register, said executor setting a state value stored in said control register during execution of said predetermined reset sequence and said state value is modified by said host during said complex in-circuit emulation test.

21. The apparatus as set forth in claim 15 wherein said impending test criterion is said executor beginning a predetermined task switch sequence.

22. The apparatus as set forth in claim 21 wherein said begin test point occurs upon completion of said predetermined task switch sequence.

23. A computer system apparatus comprising:

a host system;

a target system;

an in-circuit emulation bus for communication of in-circuit emulation commands and data between said host and target systems;

test desired sensing means for sensing a command from said host to said target that a complex in-circuit emulation test is to be performed;

execution means disposed on said target, said execution means for executing sequences of computer instructions;

test desired indicator means for indicating to said execution means that said complex in-circuit emulation test is to be performed, said test desired indicator means set by said test desired sensing means when said complex in-circuit emulation test is to be performed;

resume execution sensing means for sensing a resume execution command from said host and, upon sensing said resume execution command, said resume execution sensing means causing said execution means to resume execution;

test break indicator;

impending test sensing means for monitoring said execution means and, if said impending test point is reached, said impending test sensing means sets said test break indicator means without halting execution;

begin test criterion sensing means for monitoring said execution means and, if said begin test point is reached when said test break indicator means has been set, said begin test criterion sensing means halts said execution and permits said host to perform said complex in-circuit emulation test.

24. The apparatus as set forth in claim 23 wherein said impending test sensing means monitors said execution means only when said test desired indicator means indicates that said complex in-circuit emulation test is to be performed.

25. The apparatus as set forth in claim 24 wherein said begin test criterion sensing means monitors said execution means only when said test break indicator means is set.

26. The apparatus as set forth in claim 23 wherein said impending test criterion is said target beginning a predetermined reset sequence.

27. The apparatus as set forth in claim 26 wherein said begin test point occurs upon completion of said predetermined reset sequence.

28. The apparatus as set forth in claim 27 wherein said apparatus further comprises control register means for storing a state value, said execution means setting said state value during execution of said predetermined reset sequence and said state value is modified by said host during said complex in-circuit emulation test.

29. The apparatus as set forth in claim 23 wherein said impending test criterion is said execution means beginning a predetermined task switch sequence.

30. The apparatus as set forth in claim 29 wherein said begin test point occurs upon completion of said predetermined task switch sequence.

* * * * *

UNITED STATES PATENT AND TRADEMARK OFFICE
CERTIFICATE OF CORRECTION

PATENT NO. : 5,574,892
DATED : November 12, 1996
INVENTOR(S) : Reed K. Christensen It is certified that error appears in the above-indentified patent and that said Letters Patent is hereby corrected as shown below:

In column 8 at line 32 and 33 delete "incircuit" and insert --in-circuit--

In column 9 at line 16 delete "teat" and insert --test--

In column 10 at line 22 delete "for the" and insert --forth--

Signed and Sealed this

Eighth Day of July, 1997

Attest:

Attesting Officer

BRUCE LEHMAN

Commissioner of Patents and Trademarks